(12) United States Patent
Aizawa et al.

(10) Patent No.: US 7,659,927 B2
(45) Date of Patent: Feb. 9, 2010

(54) DIGITAL VIDEO CAMERA AND MODE CHANGING METHOD

(75) Inventors: Toyokazu Aizawa, Sagamihara (JP); Tatsuhiko Ikehata, Ome (JP); Shiro Nagaoka, Ome (JP); Tatsuro Abe, Ome (JP); Kuniaki Takahashi, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 475 days.

(21) Appl. No.: 11/515,917

(22) Filed: Sep. 6, 2006

(65) Prior Publication Data

US 2007/0064123 A1 Mar. 22, 2007

(30) Foreign Application Priority Data

Sep. 16, 2005 (JP) ............... 2005-270758

(51) Int. Cl.
*H04N 5/76* (2006.01)
(52) U.S. Cl. ............ 348/231.3; 348/231.2; 348/231.99; 348/333.05
(58) Field of Classification Search ............. 348/333.05
See application file for complete search history.

(56) References Cited

U.S. PATENT DOCUMENTS

| | | | |
|---|---|---|---|
| 6,577,805 B1 | 6/2003 | Hirai | |
| 6,714,724 B1 * | 3/2004 | Cook | ............ 386/117 |
| 2003/0043276 A1 | 3/2003 | Tojo | |
| 2003/0189652 A1 | 10/2003 | Takayama | |
| 2005/0140798 A1 | 6/2005 | Tashiro et al. | |
| 2005/0174447 A1 * | 8/2005 | Yoon et al. | ............ 348/231.99 |
| 2006/0103753 A1 * | 5/2006 | Lee | ............ 348/333.11 |
| 2006/0262203 A1 * | 11/2006 | Bae | ............ 348/240.99 |

FOREIGN PATENT DOCUMENTS

| | | |
|---|---|---|
| CN | 1638432 | 7/2005 |
| JP | 2004-364324 | 12/2004 |
| JP | 2004-364325 | 12/2004 |
| JP | 2005-71417 | 3/2005 |
| JP | 2005-191756 | 7/2005 |
| KR | 1999-0088581 | 12/1999 |
| KR | 2000-0076617 | 12/2000 |
| KR | 2003-0079771 | 10/2003 |
| KR | 10-2004-0086609 | 10/2004 |
| KR | 10-2004-0101407 | 12/2004 |

OTHER PUBLICATIONS

European Search Report dated Dec. 1, 2006 for Appln No. 06120105.9-2223.
Korean Office Action dated Jan. 24, 2008 for Appln. No. 10-2006-0088126.
Chinese Office Action dated Sep. 26, 2008 for Appln. No. 2006101395102.
Japanese Office Action dated Dec. 8, 2009.

* cited by examiner

*Primary Examiner*—Nhan T Tran
*Assistant Examiner*—Angel L Garces-Rivera
(74) *Attorney, Agent, or Firm*—Pillsbury Winthrop Shaw Pittman, LLP (57) ABSTRACT

According to an embodiment of the invention, in a digital video camera using a non-tape recording medium, the user can select whether to save a moving image file in a divided form or as one file, when recording a moving image, by changing the function of a REC button. When one moving image file has been saved in a divided form, a moving image file to be reproduced is easily searched, and a moving image is quickly played from an object chapter, or from a divided sub-file.

7 Claims, 6 Drawing Sheets

DIGITAL VIDEO CAMERA AND MODE CHANGING METHOD

CROSS-REFERENCE TO RELATED APPLICATIONS

This application is based upon and claims the benefit of priority from Japanese Patent Application No. 2005-270758, filed Sep. 16, 2005, the entire contents of which are incorporated herein by reference.

BACKGROUND

1. Field

One embodiment of the invention relates to a portable video recording apparatus, and in particular to a digital video camera using a large-capacity non-tape recording medium, and a mode changing method.

2. Description of the Related Art

A digital video camera which records a moving image on a non-tape recording medium, such as a memory card (a semiconductor memory) or a hard disc drive having an extended recording capacity, has achieved widespread use.

A major characteristic of a video camera of the type for recording a moving image on a non-tape recording medium is that one file is created each time a recording (REC) button is turned on and off, compared with a digital video camera of the type for recording a moving image on a tape-like recording medium.

This characteristic is advantageous to high-speed immediate access to an object image when accessing a file for reproduction.

For example, Japanese Patent Application Publication (KOKAI) No. 2004-364325 discloses a recording/reproducing apparatus of the type for recording an image on an optical disc or a hard disc, which recognizes a position where recording is halted and restarted as a boundary of chapters.

Since one file is created each time a recording (REC) button is turned on and off in a digital video camera using a non-tape recording medium, even a moving image taken in a certain period is divided into files of the number equivalent to the number of times of turning on/off a recording (REC) button turning.

This is unsuitable for managing a moving image taken within a certain period as one file.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, in a digital video camera using a non-tape recording medium, the user can select whether to save a moving image file in a divided form or as one file, when recording a moving image, by changing the function of a REC button.

According to an embodiment of the invention, a digital video camera having a non-tape recording medium, such as a memory card (a semiconductor memory) or a hard disc drive with a larger recording capacity, will be explained as an example.

Figure 1:
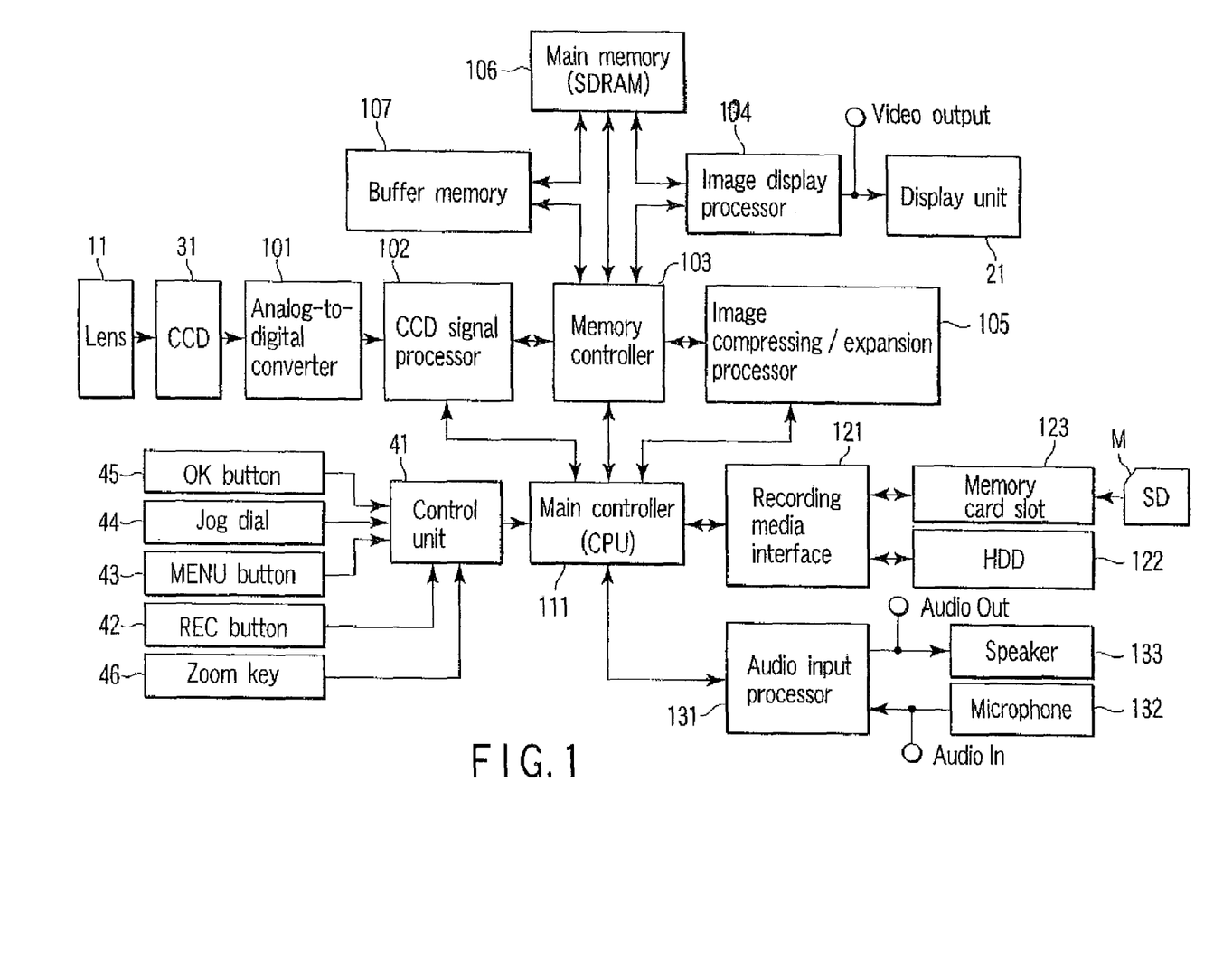
FIG. 1 is an exemplary diagram of a digital video camera using a non-tape recording medium in accordance with an embodiment of the invention.

In a digital camera 1 shown in FIG. 1, a subject image, or a moving image (or a still image), taken through a lens 11 is formed on a light-receiving plane of an image pickup element 31, or a CCD sensor, for example, and converted into an analog signal, or an electric signal, based on the light and shade of light. The subject image converted into an analog signal by the image pickup element (hereinafter called a CCD sensor) 31 is converted to a digital signal in an analog-to-digital converter 101, and is input to a signal processor 102.

The signal processor 102 performs gamma correction, color signal separation, or white balance adjustment, for example, for a pickup image data obtained by converting a subject image into a digital signal in the analog-to-digital converter 101.

The pickup image data output from the signal processor 102 is supplied to an image display processor 104 through a memory controller 103. Although not described in detail, the image display processor 104 includes a video interface, an on-screen display (OSD) processor, and a video decoder, for example, and generates an image signal for a display output, or a video signal. The output of the image display processor 104 is displayed in a display unit 21, or an LCD panel, for example, through a liquid crystal panel driving circuit not described in detail. The output of the image display processor may also be output to a video output (terminal) for an external unit.

The pickup image data from the signal processor 102 is compressed by an image compression/expansion processor (encoder/decoder) 105 (from a memory controller 103), when recording, and recorded in a recording area of a predetermined recording unit/recording medium under the control of a main controller (CPU) 111. In the image compressing/expansion processor 105, a still image is compressed by a well-known compressing method, such as JPEG standard, and a moving image (non-still image) is compressed by the MPEG standard.

The main controller (CPU) 111 is connected to a hard disc drive (hereinafter called an HDD) incorporating a large recording capacity hard disc (not shown) capable of holding approximately 10,000 still images or moving images of maximum several hours depending on a compression rate (picture quality) in recording, through a recording media controller 121.

The main controller (CPU) 111 is also connected to a removable (demountable) recording medium, for example, a memory card slot 123 capable of transferring image data with a card medium M that is a nonvolatile semiconductor memory, through the recording media controller 121. As a card medium M, for example, a semiconductor memory called an SD card and mini-SD (registered trademarks) or various media of similar standards/recording methods, can be used.

The main controller (CPU) 111 is further connected to an audio input/output processor 131, capable of processing the data other than the image data, voices and sounds (non-voice) corresponding to the images picked up by the CCD 31, as a digital signal. The voices/sounds (non-voice) taken simultaneously with the images (or added later by editing, though not described in detail) are held in a predetermined recording area by relating to the image data, by a well-known recording method represented by WAV, AC-3 or linear PCM.

When playing the images, or when displaying the image data held in the card medium M or the hard disc incorporated in a HDD 122, the image data read from the HDD 122 or the card medium M is expanded in the image compression/expansion processor 105, supplied to the image display processor 104 through the memory controller 103, and displayed in the display unit 21.

When reproducing the image data recorded in the HDD 122 or card medium M, a well-known thumbnail display increased in retrievability (operability) by displaying several reduced images is available.

As a function combining the functions of recording and reproducing, a well-known change of order in editing and playing is also possible.

When creating a thumbnail image, editing in the edit mode, and changing the order of image files, the image data is transferred between the memory controller 103 and a main memory 106 (a memory circuit, e.g., SDRAM) or a buffer (work) memory 107 connected to the memory controller 103, though not described in detail, and a reduced image is created.

The buffer memory 107 can temporarily hold the image data for one screen. The buffer memory 107 is used also for matching the transfer rate when copying or transferring a part or all of the image data recorded in the HDD 122, for example, to the card medium (memory card) M. The image data saved in the buffer memory 107, or the created reduced image, or the image under editing, is displayed in the display unit 21 through the image display processor 104, and can be monitored one by one (the state of editing the image can be confirmed).

The camera 1 can take in sound/audio data through an audio input terminal (Audio In) or a microphone 132 connected to the audio input/output processor 131, when editing or shooting. The sound/audio data is related to the taken image data, or an image file, and recorded in an area in the HDD 122 or card medium M.

The sound/audio data recorded by relating to an image file is read by relating to the taken image data when playing the image (moving and still images), and output to an output terminal (Audio Out) or a speaker 133 as a sound/audio output. It is of course possible to turn off (set the output level to "zero") the sound/audio data to be output from the speaker 133.

Figure 2A:
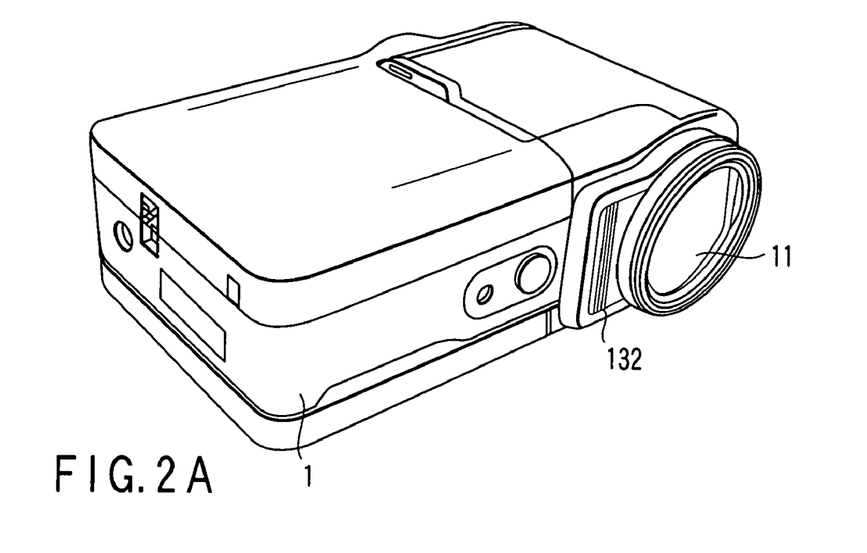
FIGS. 2A and 2B are exemplary diagrams each explaining a control unit and a display unit (monitor) of the camera shown in FIG. 1 in accordance with an embodiment of the invention.
Figure 2B:
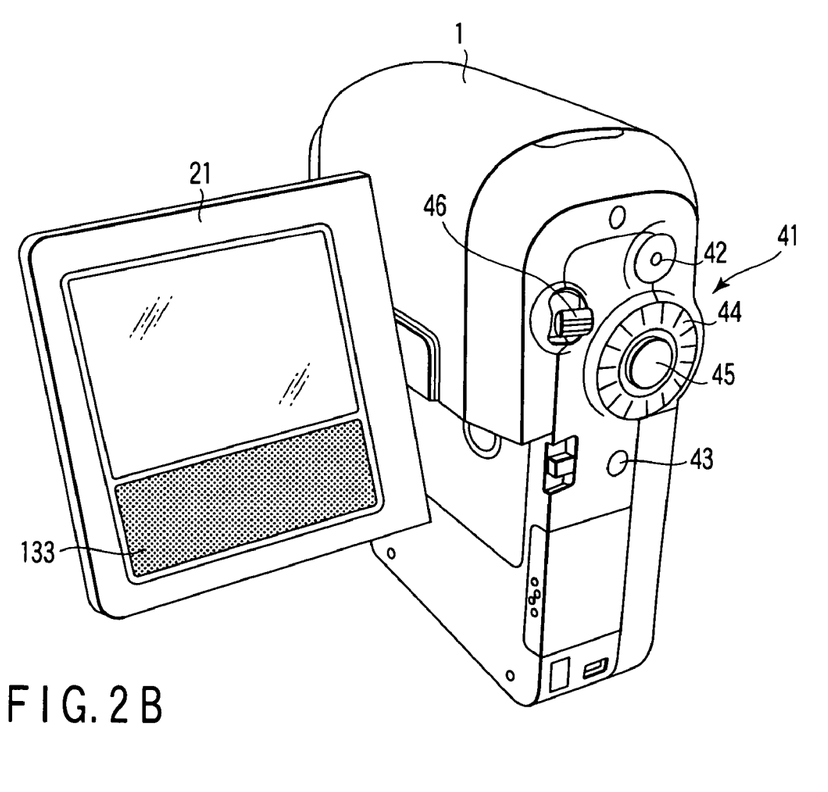

External views of the camera 1 are shown in FIGS. 2A and 2B. In addition to the display unit 21 described above, the main body of the camera 1 is provided with a control unit 41 which can instruct (input) a control signal represented by selection of operation mode, selection of image and mode in playing/editing, and start (on)/stop (off) of recording (image recording), to the main controller 111 depending on the user's operations.

The control unit 41 is provided with a REC (recording) button 42 capable of inputting a control signal to instruct start/stop of recording, a MENU button 43 used to input a control command to display a MENU (menu) screen used for shifting to selection of a mode in editing, a jog dial 44 used to select an image for playing/editing or to select a mode in editing, an OK (set) button 45 capable of inputting a control signal to set the mode or display change defined selectively by the jog dial 44, and a zoom key 46 capable of inputting a control signal to continuously change the magnification of an image taken in through the lens 11.

The jog dial 44 and OK button 45 enable smooth selection of many images/titles and setting of various modes. (A switch with a high operability, such as a jog dial 44, is useful for searching a lot of images/titles and finding out a specific one.) The contents input from the jog dial 44 (by the user's operation), or the operation states of the camera 1, or the displays of the MENU screen by the MENU button 43 are synthesized through the main controller or CPU 111, memory circuit 106, and image display processor 104 (and a not-shown video interface and an OSD processor), and displayed in the LCD (display unit) 21. Based on this information (OK button 45 on), the CPU 111 decides the image, title or mode selected by the jog dial 44, for example, and executes playback or mode setting.

Mostly, the signal input to the CPU 111 by the OK button 45 is the information (on-signal) that the button is pressed. But, by the judgment of the CPU 111 based on the number of times (usually "1") and the operation state at that time, in the standby state where the main power supply is turned on by a not-shown main switch, for example, recording (shooting a moving image) is started by turning on the OK button 45, and stopped by turning on the OK button 45 again.

The OK button 45 is also used to input a decision signal to set the operation or mode defined by a graphical user interface (GUI), such as an icon or a bar displayed in reverse by the operation of the jog dial 44, in the state that the MENU screen is being displayed in the display unit 21, for example. The jog dial 44 gives the CPU 111 information about its rotation angle and rotation speed. By this information, the CPU 111 can control the speed to display the next image or GUI.

The OK button 45 is provided coaxially (concentrically) at the center of rotation of the jog dial 44, for example. When a force is applied (pressed)(by the user) to substantially the center (in the axial direction), the OK button 45 can input the above-mentioned on-signal. When a force is added to any one of the four directions equally dividing the circumference of the button (generally called "up/down/left/right"), the OK button 45 can input a control command (instruction) to scroll the image displayed in the display unit 21 in the force-applied direction (one of the four directions demanded by the user to move).

The REC button 42 and OK button 45 give the CPU 111 the information about the depression of each button (On signal each time the button is pressed). The functions of the REC button 42 and OK button 45 can be changed by the procedure explained hereinafter by using FIG. 5 to FIG. 7.

The OK button 45 is designed to generate a click (operation) noise slightly whenever turned on. This is useful to increase the operability of the OK button 45 placed concentrically with and at the center of the jog dial 44. Contrarily, the REC button 42 is given the structure not to generate an operation (click) noise.

Therefore, when shooting a moving image in a PAUSE mode to include a division (also called a sector or a chapter) divided non-successively in time in one moving image file, assign an input of a control signal for PAUSE/REC (reset) to the REC button 42, and an input of a control signal for FILE CLOSE (end of recording as one file) to the OK button 45, thereby preventing recording of the button operation (click) noise during PAUSE. The PAUSE mode is common in a digital video camera using a tape-like recording medium in terms of the structure of its data (file), but has not been reported up to now in a digital video camera using a non-tape recording medium (the inventor does not confirm a precedent).

Next, the PAUSE mode will be explained.

As is well known, in a digital video camera using a tape-like recording medium, when the REC (recording) button is turned on during recording, the PAUSE mode is set in most cases. When the REC button is turned on again during recording, an image is successively recorded (recording is continued) from the position (on a tape) where the previous data is recorded.

In contrast to the above, in a digital video camera using a non-tape recording medium such as a hard disk or a card memory, when the REC (recording) button is turned on during recording, a file is usually closed (recording is ended), and one file is completed.

Therefore, in this embodiment, the REC button 42 is given a function to set the PAUSE mode, and when the PAUSE mode is set, recording can be paused (a file is not closed), and when the REC button 42 is turned on again, a moving image can be recorded successively playable from the previously recorded data. Hereinafter, this function is called a REC PAUSE mode.

Of source, the recording during the PAUSE mode where a file is not closed (a method of recording data successively playable from the previously recorded data) is optional. Various methods presently used for recording a moving image in a card memory or a hard disc in the hard disc drive (HDD) 122 are also applicable.

If the REC PAUSE mode is executed by turning on the REC button 42 during the PAUSE mode, for the purpose of managing as one moving image file, a control signal, flag, or time information is inserted at the moment becoming non-successive in time, or a sub (small) file (necessary for management of data) is defined in a file. Thus, a division (also called a sector or a chapter) is recorded by using the control signal, flag, time information, or a start position of a sub (small) file (an address of a recording start position). By using this division (hereinafter called a chapter), playback by immediate access (playing the first data of each chapter at every predetermined time, or by units of predetermined amount of data) is possible.

Figure 3:
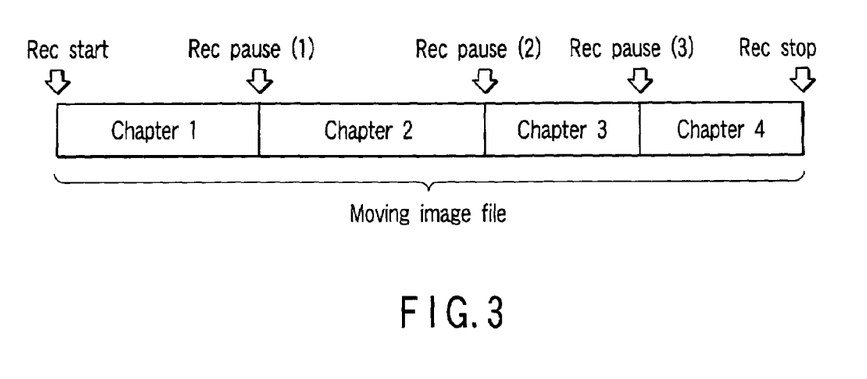
FIG. 3 is an exemplary diagram showing an example of a data (file) structure of an image file created in the camera shown in FIG. 1 in accordance with an embodiment of the invention.

FIG. 3 conceptually shows an arrangement of moving image data recorded by using the above-mentioned REC PAUSE mode.

As seen from FIG. 3, by using the REC PAUSE mode, a plurality of division (chapter) non-successive in time is formed in one file. In FIG. 3, REC PAUSE 1 to REC PAUSE n indicates the state that the REC button 42 is turned on (once) during the REC PAUSE mode, and the recording is temporarily stopped, and means that when the REC button 42 is turned on again, image data is recorded successively playable from the previously recorded image data. In FIG. 3, REC STOP at the latest end (right-side end) on the time axis indicates that a file is closed (recording is finished) by saving a series of recorded data as one file.

As a file is formed as shown in FIG. 3, an optional chapter (division) is specified, as explained later with reference to FIG. 12 and FIG. 13, and the recorded image can be played from that position (chapter/division).

Figure 4:
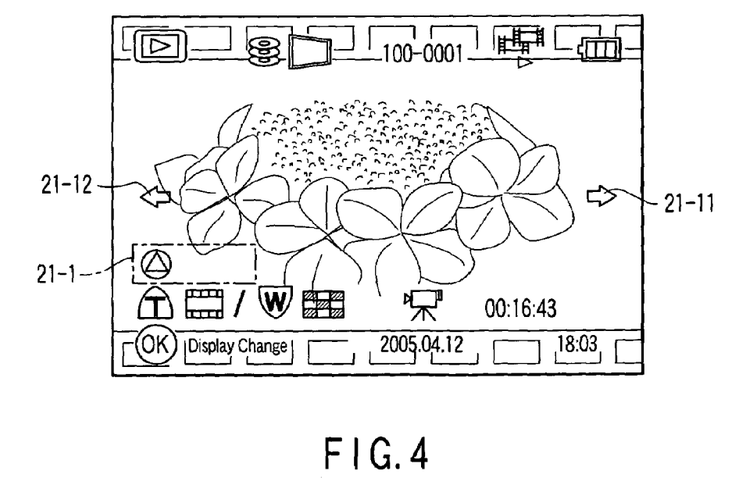
FIG. 4 is an exemplary diagram showing an example of display (a playback standby screen) in the display unit of the camera shown in FIGS. 2A and 2B in accordance with an embodiment of the invention.
Figure 5:
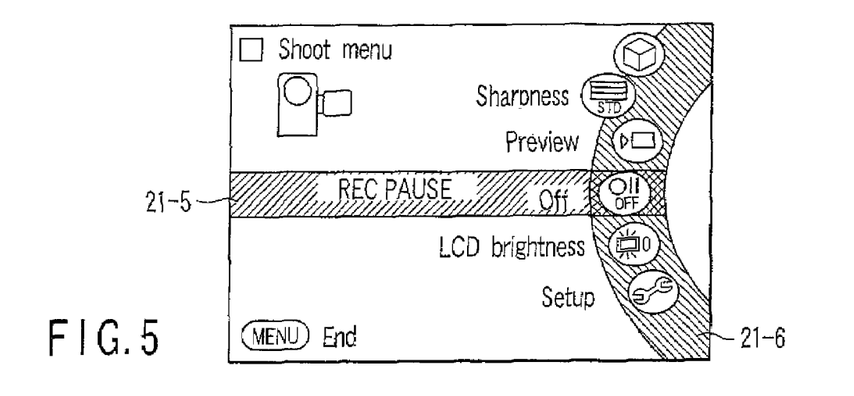
FIG. 5 is an exemplary illustration showing an example of display (a MENU screen for assigning the function of REC PAUSE button) in the display unit of the camera shown in FIGS. 2A and 2B in accordance with an embodiment of the invention.

Next, an explanation will be given on a method of setting the REC PAUSE mode with reference to FIG. 4 to FIG. 7. FIG. 4 shows an example of display in the display unit 21, indicating a playback standby state set when a not-shown main power switch of the video camera 1 is turned on, and a mode switch not described in detail is set to "PLAY". FIG. 5 shows an example of display, indicating that the MENU button 43 is turned on in the playback standby state shown in FIG. 4, and the MENU screen is displayed in the display unit 21, and that the REC PAUSE mode can be set by operating the jog dial 44 by the user.

As shown in FIG. 5, when the jog dial 44 is operated (by the user) on the MENU screen, the cursor 21-5 is moved to REC PAUSE (actually, when the jog dial 44 is rotated, the display item is moved vertically, and the item displayed in reverse corresponds to the cursor 21-5), and the OK button 45 is turned on (by the user), the REC PAUSE mode can be set/reset (not set). The example of display shown in FIG. 5 indicates that the REC PAUSE mode is not set (in the factory default setting, or reset later by the user). SET/RESET of the REC PAUSE mode functions also as an input for setting (changing the function of the button) to permit use of the REC button 42 as a PAUSE button, while the REC PAUSE mode is being set.

Figure 6:
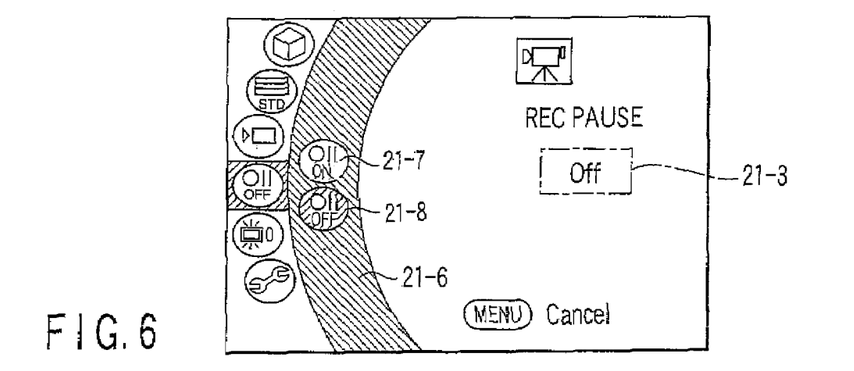
FIG. 6 is an exemplary illustration showing an example of display (a "NON-SET [RESET]" state screen of the function of REC PAUSE button) in the display unit of the camera shown in FIGS. 2A and 2B in accordance with an embodiment of the invention.
Figure 8:
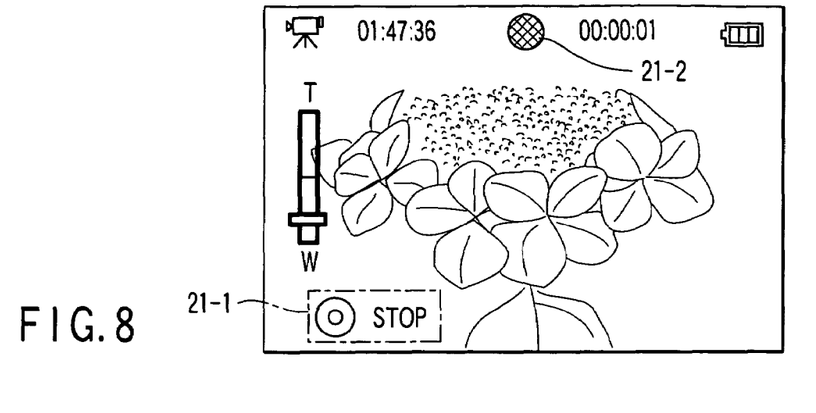
FIG. 8 is an exemplary illustration showing an example of display (a "NON-SET [RESET]" state screen of "REC PAUSE" mode, a REC state screen) in the display unit of the camera shown in FIGS. 2A and 2B in accordance with an embodiment of the invention.

When REC PAUSE is selected on the MENU screen shown in FIG. 5, OFF is displayed in a display area 21-3 in the example of display in the display unit 21. In this case, a REC PAUSE ON icon 21-7 used to input an ON control command and a REC PAUSE OFF icon 21-8 used to input an OFF control command are displayed in an arc-shaped dial ring display 21-6 located between the reversed cursor display 21-5 and display area 21-3. (FIG. 6 shows the state that the OFF icon 21-8 is pressed [NOT SET is selected].) In the display screen for recording with REC PAUSE not set, an icon (mark or image) indicating an operation to be taken when the OK button 45 is pressed next, or a STOP mark, is displayed at a predetermined position 21-1 (lower-left in FIG. 8), as shown in FIG. 8. At this time, "○ . . . red" indicating under-recording is displayed in a display area 21-2 (upper-center in FIG. 8) to display a current operation state.

Figure 7:
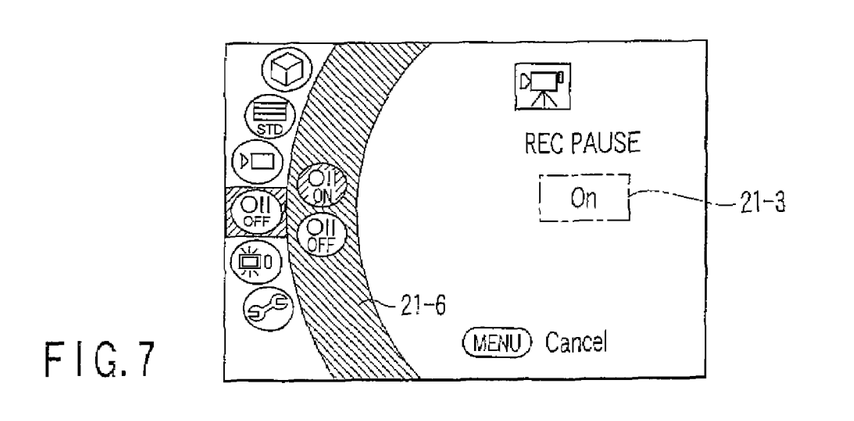
FIG. 7 is an exemplary illustration showing an example of display (a "SET" state screen of the function of REC PAUSE button) in the display unit of the camera shown in FIGS. 2A and 2B in accordance with an embodiment of the invention.
Figure 9:
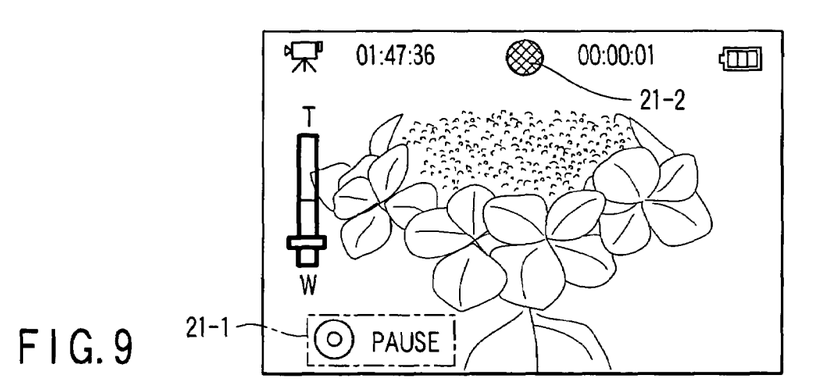
FIG. 9 is an exemplary illustration showing an example of display (a "SET" state screen of "REC PAUSE" mode, a REC state screen) in the display unit of the camera shown in FIGS. 2A and 2B in accordance with an embodiment of the invention.

When the OK button 45 is turned on in the state shown in FIG. 6, the state that the REC PAUSE ON icon 21-7 is pressed (the state that the REC PAUSE OFF icon 21-8 is reset) is displayed as shown in FIG. 7, and the REC button 42 is given the function of the REC PAUSE button by the control of the main controller 111 (refer to FIG. 1). Further, the content of the display area 21-3 of the display unit 21 is changed to ON. In the display screen for recording with REC PAUSE set, a PAUSE mark is displayed as an icon (mark) indicating an operation to be taken when the OK button 45 is pressed next, at the position 21-1 where an icon (image/mark) indicating an operation to be taken when the OK button 45 is pressed next (turned on) in FIG. 8 is being displayed, as shown in FIG. 9. At this time, "○ . . . red" indicating under-recording is displayed in the display area 21-2 to display a current operation state.

Figure 10:
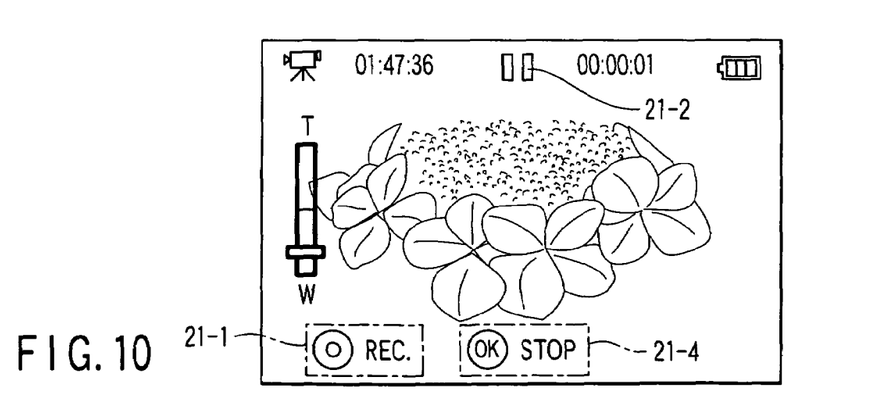
FIG. 10 is an exemplary illustration showing an example of display (a "SET" state screen of "REC PAUSE" mode, a REC-PAUSE state screen) in the display unit of the camera shown in FIGS. 2A and 2B in accordance with an embodiment of the invention.

FIG. 10 shows an example of display to be displayed in the display unit 21, when the REC button 42 (functions as a PAUSE button, here) is turned on during recording in the state that the REC PAUSE mode explained in FIG. 5 to FIG. 7 is being set.

Figure 11:
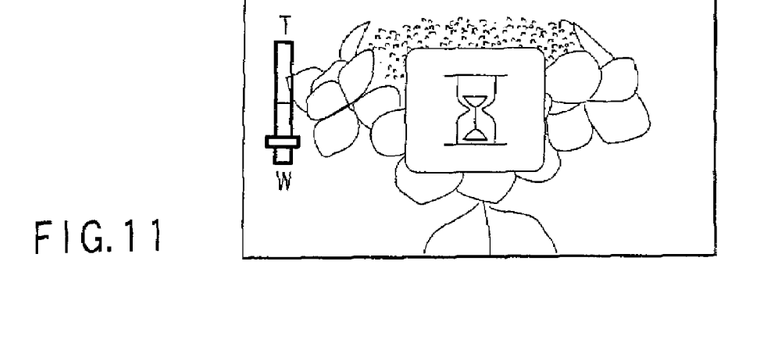
FIG. 11 is an exemplary illustration showing an example of display (a "SET" state screen of "REC PAUSE" mode, a REC stop (file closed) state screen) in the display unit of the camera shown in FIGS. 2A and 2B in accordance with an embodiment of the invention.

As shown in FIG. 10, when the REC button 42 is turned on during the recording operation in the state that the REC PAUSE mode is being set, a mark indicating PAUSE, for example, two slender lines . . . green or yellow are displayed in the display area 21-2 to display a current operation state. A REC mark is displayed in the area 21-1 to display an icon (image/mark) indicating an operation to be taken when the OK button 45 is pressed next (turned on). Further, as a characteristic of the display during the recording operation in the state that the REC PAUSE mode is being set, when a button to be operated next to stop recording, or the OK button 45, is turned on, a stop mark 21-4 indicating stopping of recording by closing a file is displayed in the right-hand side (lower-center) of the display area 21-1. In a display to indicate a mark stop of recording by closing a file, a mark meaning WAIT, for example, is used as shown in FIG. 11.

The setting to permit use of the REC button 42 as a PAUSE button explained in FIG. 5 to FIG. 7 is invalid, as well as the REC PAUSE mode, in the factory default setting or when reset by the user. Therefore, it does not particularly restrict the user who does not need REC PAUSE. (This does not influence the operability for the user who wants a conventional operating method.)

Figure 12:
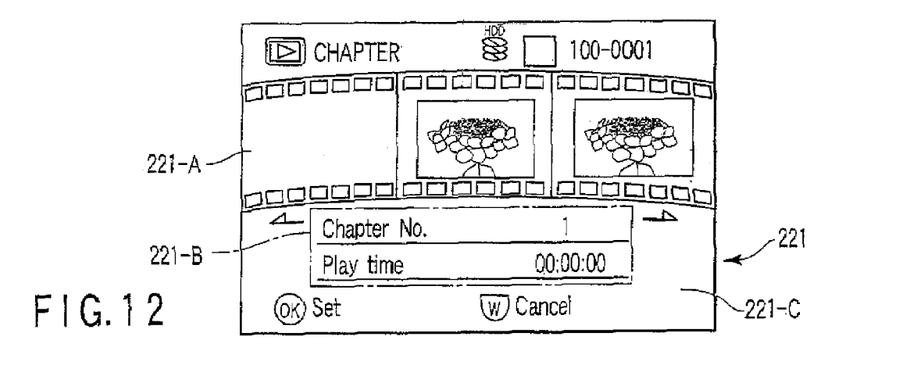
FIG. 12 is an exemplary illustration showing an example of display (a chapter replay input screen for an image data taken in a "SET" state of "REC PAUSE" mode) in the display unit of the camera shown in FIGS. 2A and 2B in accordance with an embodiment of the invention.

FIG. 12 shows an example of display in the display unit when playing a moving image recorded with the data (file) structure shown in FIG. 3.

As already explained in FIG. 4, when the zoom key 46 is operated (slid to T) in the state that the mode switch (not described in detail) of the digital video camera 1 is set to PLAY and a screen (standby screen) indicating the playback standby state is being displayed, the standby screen 221 being displayed in the display unit 21 will have a chapter display frame 221-A, a chapter number display area 221-B to display a chapter number, and a play time display area 221-C to display a play time (a continuous time in a file divided by a chapter), as shown in FIG. 12. Instead of using the zoom key 46, the chapter can also be displayed by selection with the jog dial 44 indicated by the arrow 21-11 on the right side and indicated by the arrow 21-12 on the left side in the standby screen (FIG. 4) displayed in the display unit 21, and input by turning on the OK button 45.

When the display of the display unit 21 is switched to the chapter display, according to the data (file) structure shown in FIG. 3, for example, the thumbnails of the first image of chapter 1 or the image at the position of REC START (usually, 0:00 sec), the first image of chapter 2 or the image at the position of REC PAUSE (1) (01:56 sec in FIG. 13), the first image of chapter 3 or the image at the position of REC PAUSE (2), and the first image of chapter 4 or the image at the position of REC PAUSE (3) are prepared in the main memory 106 (refer to FIG. 1) or the buffer memory 107 (refer to FIG. 1), and displayed in the chapter display frame 221-A in the order of the chapter numbers.

Figure 13:
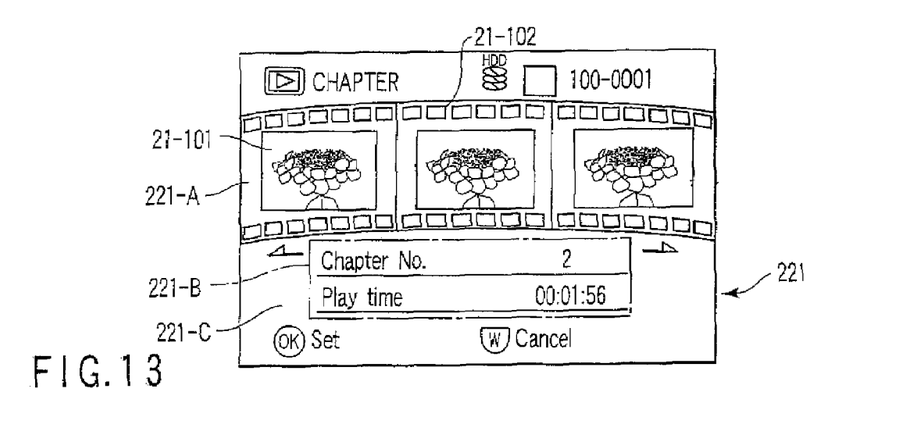
FIG. 13 is an exemplary illustration showing an example of display (a replay of chapters of an image data taken in a "SET" state of "REC PAUSE" mode, a chapter select screen) in the display unit of the camera shown in FIGS. 2A and 2B in accordance with an embodiment of the invention.

For example, as shown in FIG. 13, when the image of the chapter 2 is selected by the jog dial 44 and the OK button 45 is turned on, the first image of the chapter 2, or the image data of REC PAUSE (1) (a moving image from 01:56 sec) is played.

Of course, the method of displaying thumbnail images and the configuration for that are optional, and various methods presently used for playing a moving image recorded in the hard disk 12 or card memory M are applicable.

As explained hereinbefore, according to the digital video camera of the invention using a non-tape recording medium, when the button assigned to the REC PAUSE function is pressed during recording, recording is stopped, and the REC PAUSE screen appears (REC PAUSE is executed). A file is not yet closed in this state, and when recording is restarted, image data is recorded as one file continued from the previous recording. On the REC PAUSE screen, a REC PAUSE mark indicating that the recording is paused is displayed. Namely, recording of a moving image including a pause (recording of image data in one file, including an optional number of divisions (also called a section or a chapter) non-successive in time) is possible. This has not been reported in a digital video camera using a non-tape recording medium.

Further, in the digital video camera using a non-tape recording medium according to the invention, when the button assigned to the REC PAUSE function is pressed during recording or REC PAUSE, recording is stopped, a moving image file is closed by displaying a file closing message, and the monitor screen appears (recording of image data as one file including an optional number of sub [small] files non-successive in time is completed).

Even if a button which generates a click (operation) noise is adopted as a button assigned to the REC PAUSE function for the purpose of increasing operability, recording of a click noise during the REC PAUSE mode can be prevented by assigning a button designed silent generating no click (operation) noise, to the REC PAUSE button (optionally by the user setting).

Further, in the digital video camera using a non-tape recording medium according to the invention, it is possible to set/reset (not set) the REC PAUSE function itself by the user setting. This provides a conventional operating method to the user who does not need the REC PAUSE function.

In the REC PAUSE mode, when the REC PAUSE button, or the REC button is turned on and REC PAUSE is executed, a control signal, flag or time information is inserted at the moment becoming non-successive in time, or a sub (small) file (necessary for management of data) is created in a file, thereby preventing a common scene from being divided into a number of separate moving image files, and enabling management as one moving image file. This is useful for immediate access when arranging and playing a file, or displaying in list form.

Namely, a division (also called a sector or a chapter) is recorded for each time REC PAUSE is executed in the REC PAUSE mode (at an optional position in the whole data), and a time (point) to prepare a thumbnail image is defined in one moving image file, and a moving image can be replayed from an optional thumbnail image as a restart position.

As described above, according to the invention, it is possible to select whether to save a moving image file by dividing or to save as one file, when recording a moving image, and to provide a digital video camera useful for arranging a moving image file. When a moving image file has been saved by being divided, it is possible to immediately access a moving image file to reproduce, and to play a moving image quickly from an object chapter. This decreases the power consumption, which is particularly important for a portable digital video camera.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A digital video camera comprising:
   an image pickup unit which optically takes in image data of an object moving image, converts the data into an electric signal of a moving image, and outputs the signal;
   an image processing circuit which converts the electric signal of a moving image output from the image pickup unit, to a digital signal;
   a data recording medium which is a non-tape recording medium, and holds the moving image data converted into a digital signal in the image processing circuit, in a file format;
   a REC button which outputs a signal to record the moving image data to be recorded on the data recording medium as a single image file and a signal to record the moving image data to be recorded on the data recording medium, together with a divided information optionally given in the single image file; and
   a mode setting button which outputs a signal to record the moving image data to be recorded on the data recording medium, together with a divided information optionally given in the single image file, and to switch function between a first mode and a second mode, either of the first mode in which one movie file is closed each time the REC button is turned on and off or the second mode in which a pause is repeated each time the REC button is turned on and off can be set.

2. The digital video camera of claim 1, wherein the mode setting button is configured to be switched to output a signal for recording as a single image fire by the signal output from the REC button, when recording the moving image data on the data recording medium.

3. The digital video camera of claim 1, further comprising:
   an image display unit which is configured to display an image obtained by reproducing the moving image data recorded on the data recording medium; and
   an output image control unit which displays an image obtained by reproducing the moving image data based on the divided information optionally given in the single image file held as a single image file on the recording medium, in the video display unit.

4. The digital video camera of claim 3, wherein the output image control unit is configured to display a thumbnail image obtained by reproducing the moving image data based on the divided information optionally given in the single image file, in the video display unit.

5. The digital video camera of claim 4 wherein the REC button is configured to input a signal to start reproduction of the moving image data, by the thumbnail image displayed in the video display unit, based on the divided information optionally given in the single image file.

6. The digital video camera of claim 5, further comprising a JOG dial which is configured to select and instruct a thumbnail image to reproduce the moving image data, by the thumbnail image displayed in the video display unit, based on the divided information optionally given in the single image file.

7. A method of changing a signal to be output from a signal input unit in a digital video camera which comprises an image pickup unit which optically takes in image data of an object moving image, converts the data into an electric signal of a moving image, and outputs the signal; an image processing circuit which converts the electric signal of a moving image output from the image pickup unit to a digital signal; a data recording medium which is a non-tape recording medium, and holds the moving image data converted into a digital signal in the image processing circuit, in a file format; a REC button which outputs a signal to record the moving image data to be recorded on a data recording medium, as a single image file and a signal to record the moving image data to be recorded on a data recording medium, together with a divided information optionally given in a single image file; a mode setting button which outputs a signal to switch function between a first mode and a second mode, either of the first mode in which one movie file is closed each time the REC button is turned on and off or the second mode in which a pause is repeated each time the REC button is turned on and off can be set characterized by comprising
   displaying a mode change acceptance screen in a display unit at the time when a mode change is instructed;
   displaying a change input screen configured to input CHANGE/RESET for a mode selected on a mode change acceptance screen; and
   switching a signal output from the mode setting button to a signal for recording as a single image file by a signal from a the REC button, when recording a moving image data on a data recording medium, at the time when a change of a selected mode is input.

* * * * *